US012169327B2

(12) United States Patent
Jamet et al.

(10) Patent No.: US 12,169,327 B2
(45) Date of Patent: Dec. 17, 2024

(54) METHOD AND A MACHINE FOR PREPARING AN OPHTHALMIC LENS TO BE EDGED (71) Applicant: ESSILOR INTERNATIONAL, Charenton-le-Pont (FR)

(72) Inventors: Nicolas Jamet, Charenton-le-Pont (FR); Hugues Ameurlain, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1680 days.

(21) Appl. No.: 16/352,153

(22) Filed: Mar. 13, 2019

(65) Prior Publication Data
US 2019/0293959 A1    Sep. 26, 2019

(30) Foreign Application Priority Data

Mar. 21, 2018   (EP) .................................... 18305314

(51) Int. Cl.
*G02C 7/02* (2006.01)
*B24B 9/14* (2006.01)
(Continued)

(52) U.S. Cl.
CPC .............. *G02C 7/024* (2013.01); *B24B 9/142* (2013.01); *B24B 9/144* (2013.01);
(Continued)

(58) Field of Classification Search
CPC ......... G02C 7/024; B24B 9/142; B24B 9/144; B24B 13/0055; B24B 49/12
(Continued)

(56) References Cited

U.S. PATENT DOCUMENTS

| 2011/0141435 A1* | 6/2011 | Dubois | G02C 13/005 351/159.74 |
| 2011/0149234 A1* | 6/2011 | Biton | G02C 13/005 351/159.74 |
| 2017/0136597 A1* | 5/2017 | Molinaro | B24B 9/144 |

FOREIGN PATENT DOCUMENTS

| EP | 2410372 B1 * | 1/2013 | ............. B24B 49/00 |
| FR | 2854268 | 10/2004 | |

(Continued)

OTHER PUBLICATIONS

Translation EP-2410372-B1 (Year: 2013).*
European Search Report for Application No. 18305314.9, dated Sep. 25, 2018.

*Primary Examiner* — James R Greece
(74) *Attorney, Agent, or Firm* — NIXON & VANDERHYE (57) ABSTRACT

A method for preparing an ophthalmic lens to be edged based on a presentation lens, includes: fixing a first support a face of the presentation lens, the first support's shape defining a first reference point; positioning the presentation lens by the first support in an optical machine having an image sensor; acquiring, with the image sensor, an image of the presentation lens; determining, on the acquired image, the outline of the presentation lens; positioning a pupillary point relative to the outline; positioning the outline of the presentation lens relative to the ophthalmic lens so the pupillary point is superimposed on a centering point of the ophthalmic lens; and fixing a second support a face of the ophthalmic lens, the second support having a shape defining a second reference point, the second support fixed on the ophthalmic lens so its second reference point is superimposed on the first reference point.

15 Claims, 5 Drawing Sheets

(51) Int. Cl.
    *B24B 13/005*     (2006.01)
    *B24B 49/12*     (2006.01)
    *B29L 11/00*     (2006.01)

(52) U.S. Cl.
    CPC .......... *B24B 13/0055* (2013.01); *B24B 49/12* (2013.01); *B24B 9/146* (2013.01); *B29L 2011/0016* (2013.01)

(58) Field of Classification Search
    USPC .................................................. 351/159.75
    See application file for complete search history.

(56) References Cited

FOREIGN PATENT DOCUMENTS

| | | | | |
|---|---|---|---|---|
| WO | WO-2008155481 A2 | * | 12/2008 | ............. B24B 9/144 |
| WO | WO-2013079821 A1 | * | 6/2013 | ............. B24B 49/00 |

* cited by examiner

METHOD AND A MACHINE FOR PREPARING AN OPHTHALMIC LENS TO BE EDGED

TECHNICAL FIELD TO WHICH THE INVENTION RELATES

The present invention relates to the domain of edging an ophthalmic lens along a desired outline in order to enable it to be mounted in a spectacle frame. The invention relates more precisely to determining a blocking position for the lens on a blocking support on which the lens is held while it is being edged.

The method is particularly adapted to edging ophthalmic lenses having great curvatures.

TECHNOLOGICAL BACKGROUND

The technical part of the optician's profession, which consists in mounting a pair of ophthalmic lenses on a spectacle frame selected by a client, is divided into four main operations:
- acquiring the shape of the outline of each presentation lens initially mounted in the spectacle frame selected by the client,
- centering each ophthalmic lens in a centering and blocking unit, this operation consisting in determining the geometrical frame of reference of the lens with the aid of centering marks provided on the latter, then in appropriately positioning the previously acquired outline such that, once it has been cut out in a manner following this outline and then mounted in its frame, the lens is correctly positioned with respect to the corresponding eye of the client in order that it carries out to the best possible extent the optical function for which it has been designed,
- blocking each lens, this operation consisting in fixing a blocking support to the lens such that the lens can be removed from the centering and blocking unit without losing the frame of reference, then
- engaging the lens in a machining unit by means of said support and cutting out (i.e. "edging") the lens following the previously centered outline.

During the acquisition operation, the presentation lens is usually placed on a flat surface, in front of a camera that is able to capture a 2D-image of this presentation lens. To this end, a device as described in document US2017/0136597 can be used.

During the blocking operation, the blocking support is usually glued on the front face of the lens in a position that is determined as a function of the centered outline. In practice, the blocking support can be glued at the center of a boxing rectangle (this rectangle being defined as the rectangle in which the centered outline is inscribed). As a general rule, the blocking support extends along a longitudinal axis that is then perpendicular to the front face of the ophthalmic lens.

During the cutting out operation, the ophthalmic lens is sandwiched by two blocking and rotary drive arms, one of which cooperating with this support. The lens is then edged by means of cylindrical grinding wheels that turn about an axis parallel to said longitudinal axis (the distance between theses axes being adjusted in order to machine the lens along its entire contour).

The drawback of this solution is that, even if the centering and cutting out operations are carried out carefully, we can observe a slight offset between the outline of the cut-out ophthalmic lens and the outline of the presentation lens.

This offset has an impact on the centering of the ophthalmic lens in front of the patient's pupil.

Above all, the error in the shape of the outline of the cut-out ophthalmic lens has an impact on the mounting of this lens into the spectacle frame, so that this mounting can require a step of reworking the edge of the lens to adjust its shape at the exact shape of the corresponding rim of the spectacle frame.

OBJECT OF THE INVENTION

The object of the present invention consists in reducing this offset.

More particularly, the invention proposes a method for preparing an ophthalmic lens to be edged, comprising:
- fixing a first support on one of the faces of a presentation lens, the first support having a shape that defines a first reference point,
- positioning the presentation lens by means of said first support in an optical machine that comprises an image sensor for acquiring images of the presentation lens,
- acquiring, with said image sensor, at least an image of the presentation lens,
- determining, on said acquired image, the shape of the outline of the presentation lens,
- positioning a pupillary point relative to the outline of the presentation lens,
- centering said ophthalmic lens by positioning the outline of the presentation lens relative to the ophthalmic lens so that the pupillary point is superimposed on a centering point of the ophthalmic lens, and
- fixing a second support on one of the faces of the ophthalmic lens, the second support having a shape defining a second reference point, the second support being fixed on the ophthalmic lens so that its second reference point is situated at a predetermined position relative to the first reference point (preferably superimposed on the first reference point).

According to the invention, because the ophthalmic lens is blocked (thanks to the second support) in the same position as the presentation lens (thanks to the first support), the image of the presentation lens is acquired along a visual axis that is parallel to the axis along which the ophthalmic lens is held during the cutting out operation. In other words, the tilt of the presentation lens relative to the camera is the same as the tilt of the ophthalmic lens in the machining unit, which ensures an edging of this ophthalmic lens along a contour that is identical to the one of the presentation lens.

On the contrary, in the state of the art, the blocking support was glued onto the ophthalmic lens in a position that was not a function of the orientation of the presentation lens relative to the camera, which caused said offset.

Further advantageous and non-limiting features of the process in accordance with the invention are the following:
- the first support having a shape that defines a first reference direction, the second support having a shape that defines a second reference direction, said second support is fixed on said face of the ophthalmic lens so that its second reference direction is superimposed on the first reference direction;
- the outline of the presentation lens being inscribed into a boxing rectangle, the first support is fixed onto said face of the presentation lens at a distance from the center of said boxing rectangle that is lower than 5 millimeters;

the method comprises a step of calculating edging parameters to machine said ophthalmic lens as a function of the position of said first reference point on the acquired image;

the first support having a shape that defines a first reference direction, said method comprises a step of calculating edging parameters to machine said ophthalmic lens as a function of the orientation of said first reference direction on the acquired image;

the centering of said ophthalmic lens comprises a step of positioning the ophthalmic lens in a second optical machine that is separate or not from said first optical machine and that comprises an image sensor for acquiring an image of the ophthalmic lens, and a step of) acquiring, with said image sensor, at least an image of the ophthalmic lens to enable the positioning of the outline of the presentation lens relative to the image of the ophthalmic lens;

said second optical machine comprising a carrier for carrying said second support, said second support is fixed on said face of the ophthalmic lens by a relative movement of said ophthalmic lens towards said carrier;

said second optical machine comprising an image display, the operation of centering said ophthalmic lens comprises a step of displaying, on said image display, at least an image of the pupillary point, and an image of the ophthalmic lens that shows at least the position a centering point of said ophthalmic lens, and a step of manually adjusting the position of the ophthalmic lens relative to the carrier so that the image of the pupillary point on said image display is superimposed on the image of said centering point;

the method comprises, before the relative movement of said ophthalmic lens towards said carrier along a blocking axis, a controlled movement of said carrier relative to the ophthalmic lens in a plane that is orthogonal or inclined relative to said blocking axis;

the position of the pupillary point is determined according to centering data relative at least to the morphology of the future user of the ophthalmic lens;

the outline of the presentation lens being inscribed into a boxing rectangle, the positions of the pupillary point, the reference point and the reference direction are determined relative to this boxing rectangle;

said presentation lens comprising at least one visible mark on one of its faces, the boxing rectangle is oriented as a function of the position of said mark on the acquired image and the first support is fixed on said face of the presentation lens at a nonzero distance from said mark;

the method comprises a step of positioning the ophthalmic lens in an edging machine by means of the second support;

said first support is manually fixed on said face of the presentation lens;

the presentation lens being initially mounted into a frame and the ophthalmic lens being designed to be mounted into said frame, the method comprises a step of removing the presentation lens from said frame.

The invention also relates to an optical machine for preparing an ophthalmic lens to be edged on the basis of a presentation lens, the optical machine comprising:

an holder, an image sensor for acquiring images of lenses positioned onto said holder, and calculating means suitable for performing a method as defined above.

DETAILED DESCRIPTION OF AN EMBODIMENT

The following description with reference to the accompanying drawings, given by way of non-limiting example makes it clear what the invention consists in and how it can be reduced to practice.

Figure 5:
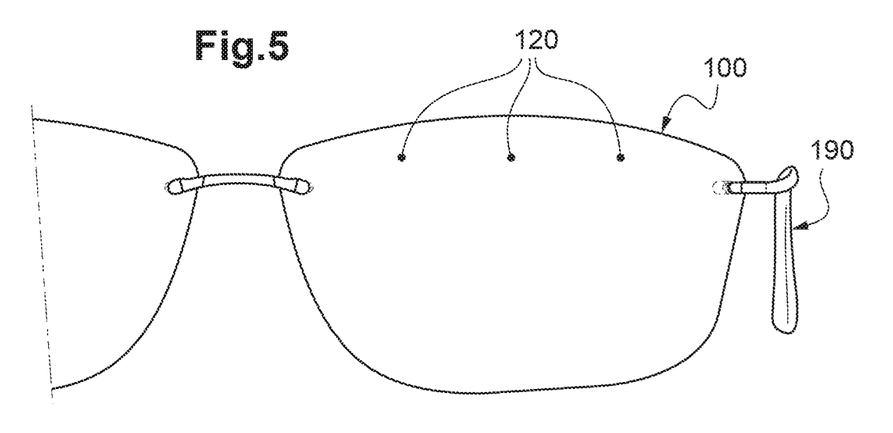
FIG. 5 is a front view of eyeglasses comprising a spectacle frame and presentation lenses.

FIG. 5 shows an eyeglasses initially comprising a spectacle frame 190 and two presentation lenses 100 intended to be replaced by two ophthalmic lenses 200 having optical refractive powers.

Figure 1:
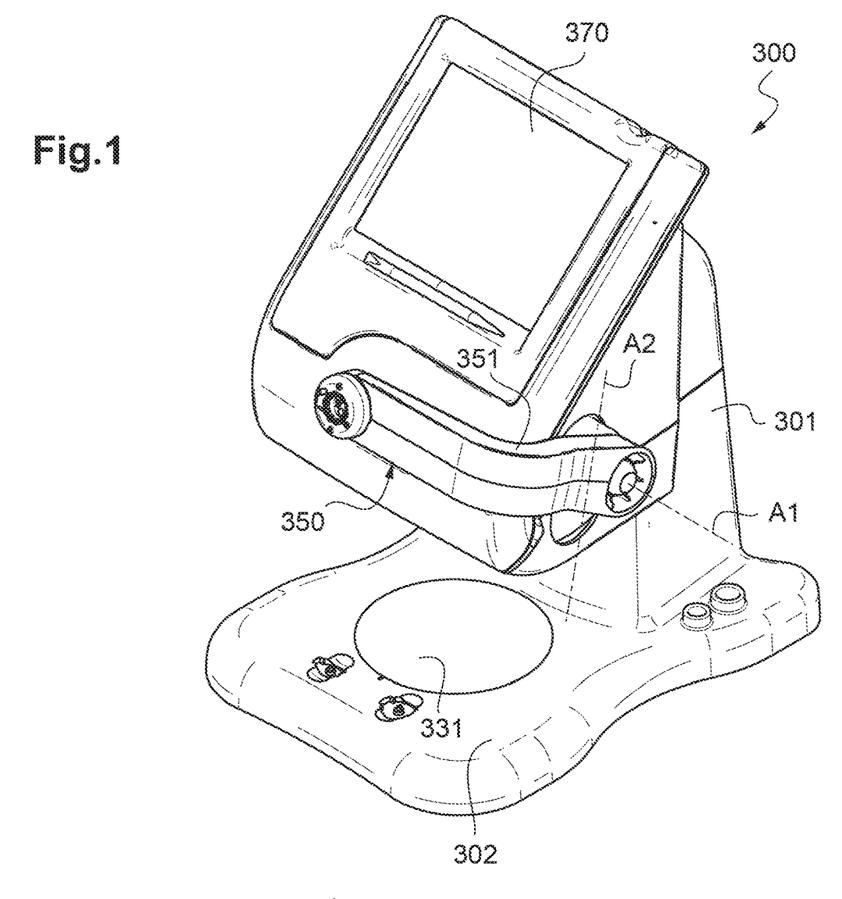
FIG. 1 is a schematic perspective view of a centering and blocking unit according to a first embodiment of the invention.
Figure 3:
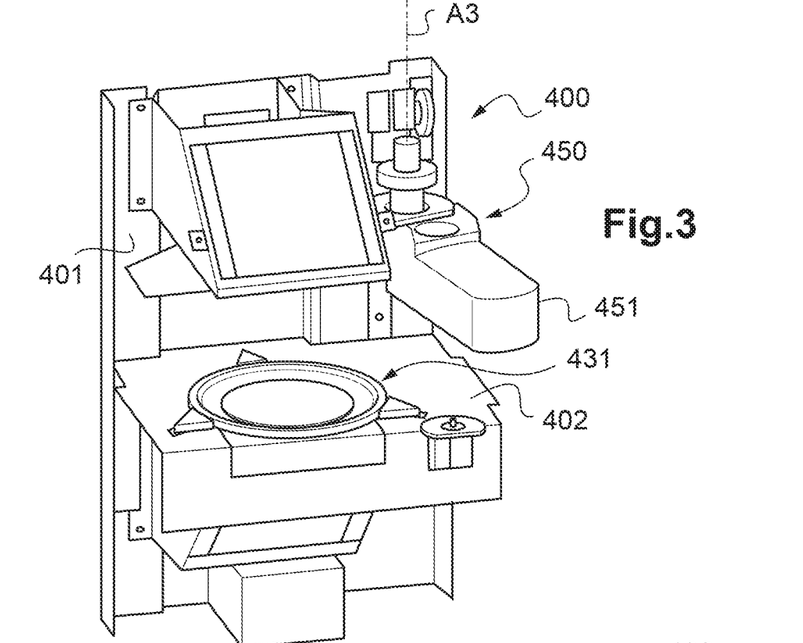
FIG. 3 is a schematic perspective view of a centering and blocking unit according to a second embodiment of the invention.

FIGS. 1 and 3 show two embodiments of an optical machine (hereinafter referred to as "the centering and blocking unit 300 or 400") for preparing an ophthalmic lens 200 with a view of its edging.

This unit is thus used to carry out centering and blocking operations for an ophthalmic lens 200 to be mounted on the spectacle frame 190.

The objective of the centering operation is to determine the contour of the presentation lens 100 initially mounted on the spectacle frame 190, to identify the frame of reference of the ophthalmic lens 200 and to determine the position which the contour is intended to occupy in this frame of reference in order that the lens, once it has been cut out in a manner following this contour and then mounted on the spectacle frame 190, is located in a suitably centered manner opposite the corresponding eye of the individual.

The objective of the blocking operation is to place an accessory (hereinafter referred to as "second support") on the ophthalmic lens, which can, on the one hand, make it easier to take hold of the ophthalmic lens 200 in order to transport it from the centering and blocking unit 300; 400 to a cutting-out unit (hereinafter referred to as "edging machine 500"), and, on the other hand, provide a stable reference mark for indicating the position of the frame of reference of the lens after it has been transported.

To this end, in the two shown embodiments, the centering and blocking unit 300; 400 comprises:
- a chassis 301; 401 (see FIGS. 1 & 3),
- a workstation 302; 402 that is fixed to the chassis in a horizontal plane and that comprises an holder 331; 431 for holding a first support fixed to a presentation lens 100,
- centering means 303; 403 for centering the lens (see FIGS. 2 & 4), said means being fixed to the chassis 301; 401 and comprising at least an image sensor 310; 410 for acquiring images of lenses,
- blocking means 350; 450 for placing a second support on an ophthalmic lens 200, said means being mounted so as to be able to move on the chassis 301; 401, and
- calculating means 340; 440 to control the centering means and the blocking means.

In the first embodiment, the centering and blocking unit 300 also comprises a touchscreen 370 fixed to the chassis 301 and oriented such that it is visible to an optician working at the workstation 302.

In both embodiments, the workstation 302; 402 comprises a transparent and planar support plate that has a function of holder 331; 431.

The blocking means 350; 450 comprise an operating arm 351; 451 that includes a carrier able to take hold of a second support and to depose it on the front face of an ophthalmic lens 200 placed on the transparent and planar support plate 331; 431.

In the first embodiment, the operating arm 351 has two degrees of freedom. It is able to rotate about a horizontal axis A1 and to go down along a vertical axis A2 in order to place the second support on the ophthalmic lens 200, above the center of the planar support plate 331.

In the second embodiment, the operating arm 451 is self-driven and has four degrees of freedom. It thus has a mobility in translation along a vertical axis A3 in order to rise or descend in the direction of the planar support plate 431 and a mobility in rotation about this axis A3 in order to move away from or toward the planar support plate 431. Its carrier (non visible) has a mobility in radial translation with respect to this axis A3 and a mobility in rotation about an axis parallel to this axis A3 (to adjust the orientation of the second support).

The means for centering the ophthalmic lens 200 are, for their part, designed to determine the shape of the outline of the presentation lens 100 and the position of the frame of reference of the ophthalmic lens 200.

Figure 2:
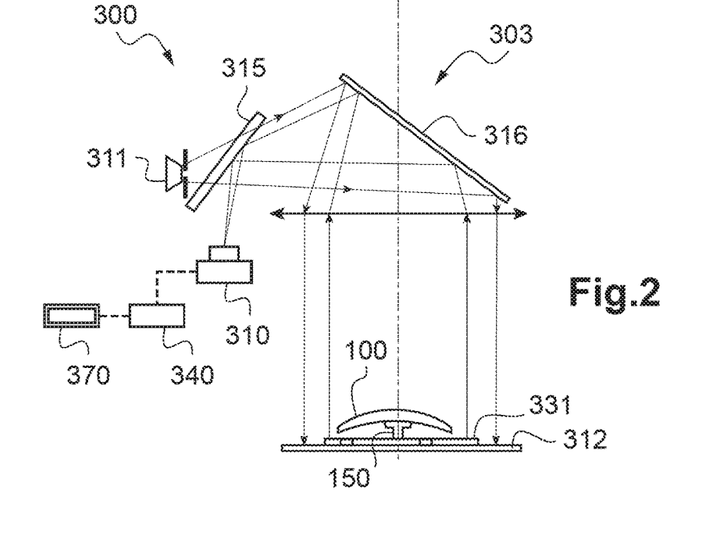
FIG. 2 is a schematic plan view of the centering means of the centering and blocking unit shown in FIG. 1.

In the first embodiment, as shown in FIG. 2, the centering means 303 comprise, on one side of the planar support plate 331, a reflector 312, and, on the other side, means 311 for illuminating the lens placed onto the planar support plate 331 and means 310 for acquiring the light reflected by the reflector 312.

The illuminating means 311 comprise a light source which emits a light beam and a mirror 316 inclined at 45° which reflects this light beam towards the lens.

The acquisition means 310 comprise a semi-reflective mirror 315 inclined at 45° and placed onto the way of the light beam, and a digital camera for acquiring images of the lens.

The optical axis A5 of the centering means 303 is defined as the axis of the light beam passing through the lens.

Figure 4:
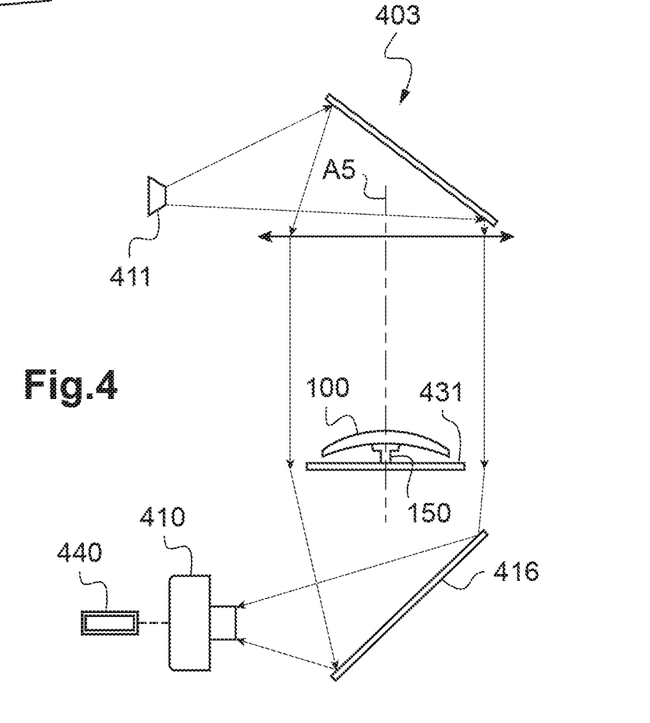
FIG. 4 is a schematic plan view of the centering means of the centering and blocking unit shown in FIG. 3.

In the second embodiment, as shown in FIG. 4, the illuminating means 411 and the acquisition means 410 are situated on both sides of the planar support plate 431. In this embodiment, there is no mirror placed under the planar support plate 431, parallel to this plate. Here, a reflector 416 inclined at 45° is used to reflect the light beam towards the acquisition means 410, and the support plate 431 is frosted.

The process according to the invention comprises five main successive operations each including several steps.

The first operation consists in determining the shape of the outline S100 of the presentation lens 100, which lens is initially mounted in the spectacle frame 190 and is preferably plano (which means that it has no optical refractive power).

To this end, in a first step, the optician manually removes the presentation lens 100 from the frame 190.

In a second step, a first support 150 is fixed onto one of the faces of the presentation lens 150 (here on the rear face of the lens).

Figure 9:
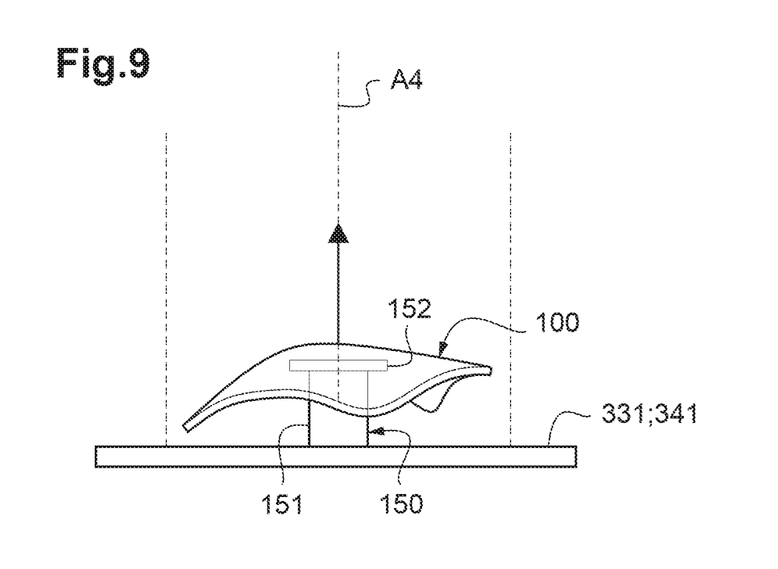
FIG. 9 is a side view of the presentation lens and of its first support when positioned in the centering and blocking unit.

As shown in FIG. 9, the first support 150 has a gripping part 151, here of cylindrical shape along a longitudinal axis A4, and a fixing part 152 that is disc-shaped and located at one end of the gripping part 151. The end face of this fixing part 152 is coated with a glue for its fixation to the lens.

Figure 6:
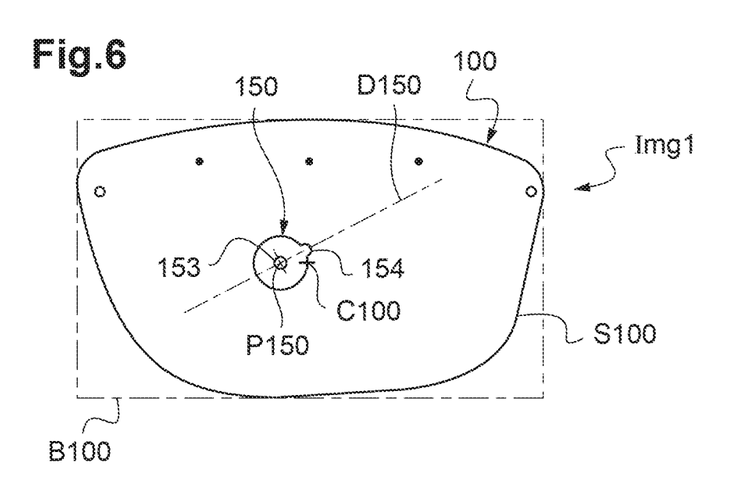
FIG. 6 shows an image of one of the presentation lenses of FIG. 5 and of a first support attached to this presentation lens.

As shown in FIG. 6, this first support 150 comprises a central hole 153 which passes through the gripping part 151 and the fixing part 152, and which extends along the longitudinal axis A4. This central hole 153 defines a first reference point P150 of the first support 150.

The fixing part 152 has a projecting side lug 154 which, in combination with the first reference point P150, defines the first reference direction D150 of the first support 105 (i.e. its orientation about the longitudinal axis A4).

In this context, it may be noted that the position of the central hole 153 and the position of the projecting side lug 154 are easy to identify by the centering means 303; 403 when the first support 150 is placed on the holder 331; 431 of the centering and blocking unit 300; 400. In other words, the frame of reference of this first support 150 is easy to identified by the centering means 303; 403 of the centering and blocking unit 300; 400.

We can contemplate, in a variant, that the first support has a different shape. For instance, it can have several holes, the position of the reference point being defined according to the positions of theses holes.

During this second step, the first support 150 may be glued on any point on the rear face of the presentation lens 100 (provided that its contour is comprised into the contour of the presentation lens).

Preferentially, the first support 150 is manually fixed near a boxing center C100 of the presentation lens 100. The boxing center C100 will be defined hereafter (it is approximately the center of the contour of the presentation lens).

Preferentially, the first support 150 is fixed at a nonzero distance from the marks engraved or painted onto the presentation lens 100 (as shown in FIG. 5, in this embodiment, three marks 120 in the form of points are painted on the front face of the presentation lens 100 in order to indicate the horizontal line of the eyeglasses).

During a third step, the presentation lens 100 is positioned in the centering and blocking unit 300; 400 by means of the first support 150. More specifically, the first support 150 is placed onto the holder 331; 431 of the centering and blocking unit 300; 400, in such a manner that its longitudinal axis A4 is parallel to the optical axis A5 of the centering means.

At this stage, it may be note that because the presentation lens 100 is plano, the light beam direction is not impacted by this lens. That is the reason why the first support 150 could have been placed either on the front face or on the rear face of the lens, without impacting measures.

We can note that, in case the presentation lens is not plano and has a little optical power, the first support 150 can be placed either on the front face or on the rear face of the lens because the generated errors will be limited.

We can also note that, in case the presentation lens is not plano and has a high optical power, the first support 150 has to be placed on the front face of the presentation lens.

Then, the blocking unit 300; 400 acquires an image Img1 of the presentation lens 100 and of its first support 150. This image is represented in FIG. 6.

During a fourth step, the calculating means determine on the image Img1 the shape of the outline S100 of the presentation lens 100, the position of the first reference point P150, and the orientation of the first reference direction D150.

This determination is made by means of image processing, in a manner known per se.

In a last step, the calculating means determine the geometric frame of reference of the outline S100 thanks to a boxing rectangle B100.

This boxing rectangle B100 is the rectangle in which the outline S100 is inscribed, two sides of which being parallel to the straight line passing through the images of the three marks 120. The center C100 of this boxing rectangle B100 is the center of the geometric frame of reference.

Figure 7:
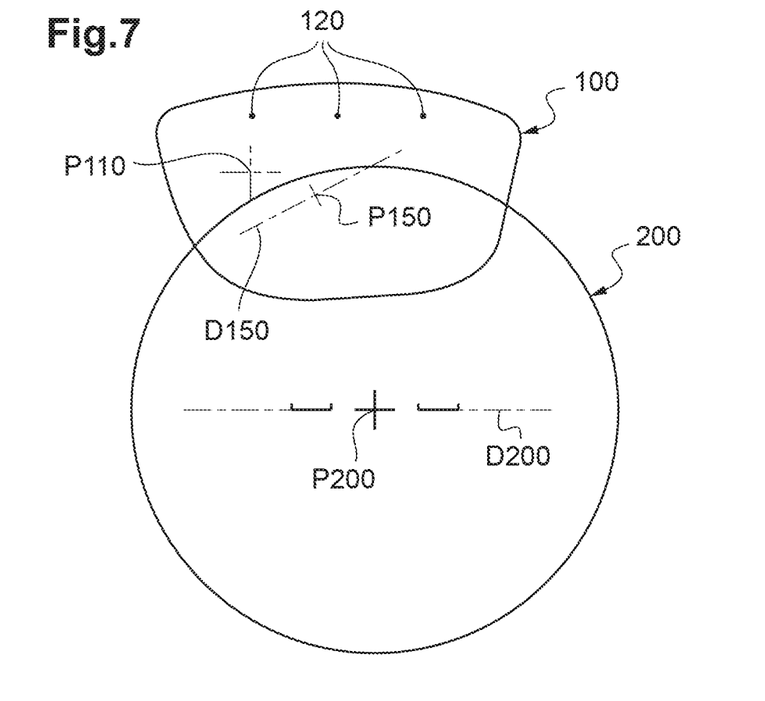
FIG. 7 shows an image of the presentation lens of FIG. 6 and of an ophthalmic lens to be edged, before a centering step.

A second operation consists in positioning a pupillary point P110 in this geometric frame of reference (see FIG. 7).

The pupillary point P110 is the point of the presentation lens 100 (when mounted in the spectacle frame 190) situated in the axis of the pupil of the eyeglasses wearer when the latter looks at a distance.

To this end, several methods are available.

A method consists in asking the optician for entering some centering data relative at least to the morphology of the future user of the ophthalmic lens 200, by means of the touchscreen 370. These data are for instance the wearer's pupillary distances EPg, EPd (i.e. the distances between each of the wearer's pupils and the sagittal plane of the wearer's head), the pupillary heights HPg, HPd (i.e. the distances between each of the wearer's pupils and the lower side of the boxing rectangle B100) and the length of the bridge of the spectacle frame 190. Thanks to these data, the calculating means can determine the position of the pupillary point P110 relative to the boxing rectangle B100.

At this stage, the presentation lens 100 and its first support 100 are removed from the centering and blocking unit 300; 400.

A third operation consists in centering the ophthalmic lens 200.

This operation consists in virtually positioning and orienting the outline S100 of the presentation lens 100 relative to the ophthalmic lens 200 so that:
  the pupillary point P110 is superimposed on a centering point P200 of the ophthalmic lens 200, and
  the boxing rectangle B100 is well oriented about the optical axis of the ophthalmic lens 200, in view of the prescription of the patient (in the case where the ophthalmic lens has a cylindrical power, there is an orientation to be complied in order to correct the patient's vision).

When the ophthalmic lens is unifocal, the centering point P200 of the lens is defined as the point where the light is not diverted in its direction when passing through the lens. When the ophthalmic lens is progressive, the centering point P200 is the point of far vision. In practice, this centering point P200 is marked by a cross on the front face of the ophthalmic lens 200. As shown in FIG. 7, two lines are also marked on either side of this cross, to define a horizontal line D200 of the lens.

The centering operation is automatically implemented by the calculating means when using the second embodiment of the centering and blocking unit 400.

On the contrary, this operation is manually executed when using the first embodiment of the centering and blocking unit 300. We can then describe this operation with this embodiment of the centering and blocking unit.

To this end, the ophthalmic lens 200 is placed on the planar support plate 331 of the centering and blocking unit 300 by means of a tripod that lies on this plate.

At this point, the touchscreen 370 displays (see FIGS. 7 and 8):
  an image relative to the presentation lens 100, that shows at least the position of the pupillary point P110, and
  an image relative to the ophthalmic lens 200, that shows at least the position the centering point P200 of the ophthalmic lens 200.

The displayed image relative to the presentation lens 100 is deduced from the image previously acquired when the presentation lens 100 was positioned in the centering and blocking unit by means of its first support 100.

Then, the optician manually moves the ophthalmic lens 200 until a position where the image of the pupillary point P110 on the touchscreen 370 is superimposed on the image of said centering point P200 and where the line passing through the three marks 120 is inclined relative to the two lines situated on either side of the centering point P200, with a tilt angle depending to the wearer's prescription.

At this stage, the ophthalmic lens 200 is considered well centered.

The fourth operation consists in blocking the ophthalmic lens 200.

During this operation, a second support 250 is fixed on one or the other side of the ophthalmic lens 200 (preferably on the front face).

This second support 250 has a shape defining a second reference point P250 and a second reference direction D250. Preferably, this second support 250 is identical to the first one. In a variant, it can be different. For instance, the second support 250 can be composed of two pieces, a first piece identical to the first support 150 and a second piece that has a function of support carrier.

According to the invention, the second support 250 is fixed on the front face of the ophthalmic lens 200, in a position where its second reference point P250 is superimposed on the first reference point P150.

Figure 8:
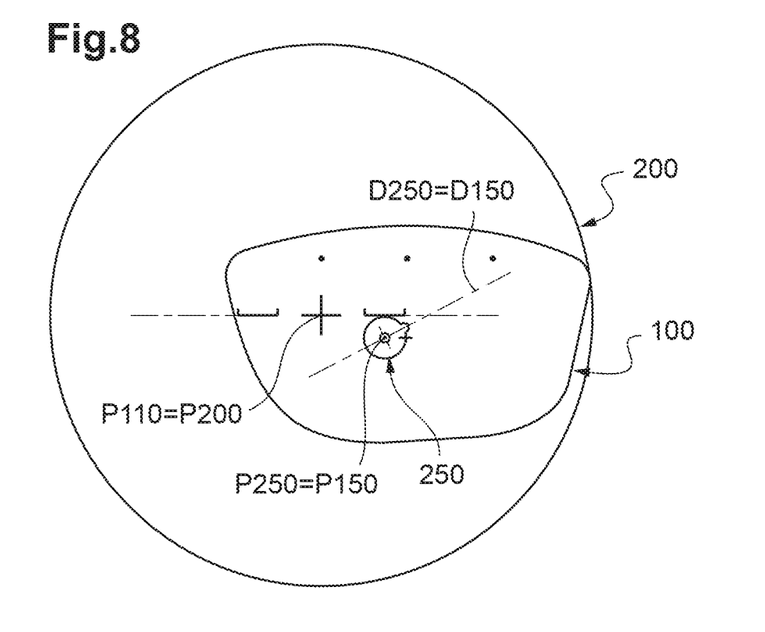
FIG. 8 shows an image of the presentation lens and of the ophthalmic lens of FIG. 7, after the centering step, and an image of a second support attached to the ophthalmic lens.

Preferably, the second support 250 is fixed on the ophthalmic lens 200, in a position where its second reference direction D250 is parallel to the first reference direction D150 (see FIG. 8).

The purpose is to block the ophthalmic lens 200 in the same position as the presentation lens was blocked by the first support 150.

When using the first embodiment of the centering and blocking unit 300, the optician has to place the second support 250 on the blocking arm 351 with a good orientation. Then, the calculating means control this arm so that the second support 250 automatically descends against the front face of the ophthalmic lens 200.

Because the image of the presentation lens 100 was positioned on the touchscreen 370 so that the first reference point P150 was centered in the axis of the end of the blocking arm 351, when descending, the second support 250 automatically comes into contact with the front face of the ophthalmic lens 200 at the first reference point P150.

When using the second embodiment of the centering and blocking unit 400, the optician has to place the second support 250 on the blocking arm 451 in any position. Then, the blocking arm 451 is controlled in such a manner that it automatically pushes the second support 250 against the front face of the ophthalmic lens 200, at the first reference point P150, with the good orientation.

Figure 10:
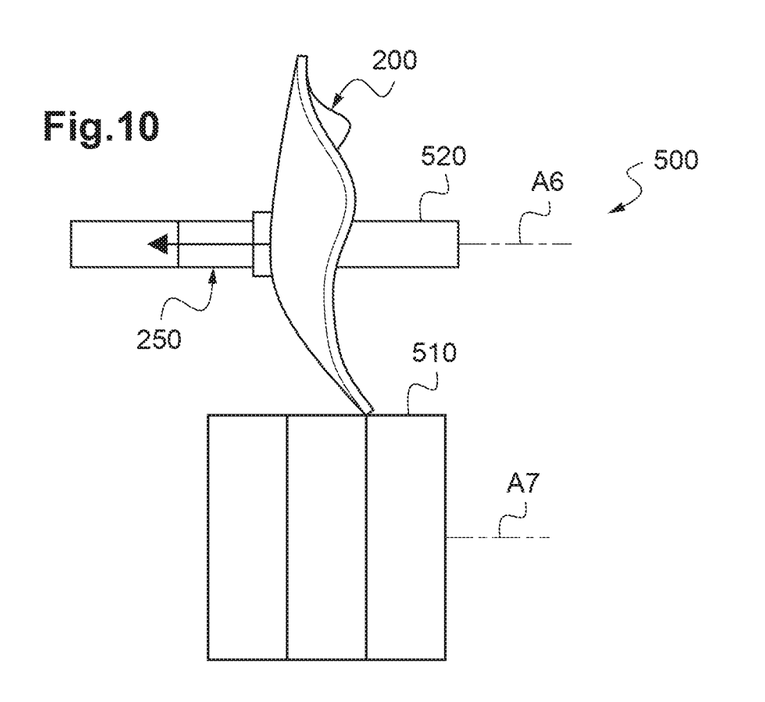
FIG. 10 is a side view of the ophthalmic lens and of its second support, when positioned in an edging machine.

The fifth operation consists in positioning the ophthalmic lens 200 with its second support 250 in an edging machine 500, by means of the second support 250.

As shown in FIG. 10, such an edging machine 500 comprises two longitudinal arms 520 able to sandwich the lens along an axis A6, to block it and to make it turn about this axis.

One of these arms is shaped so that the second support 250 is attachable to its extremity, which ensure the ophthalmic lens 200 to be blocked in the edging machine in a position where the longitudinal axis of the second support 250 merges with the axis A6.

The edging machine 500 also comprises roughing wheels 510 that are able to turn about an axis A7 parallel to the axis A6.

This edging machine 500 comprises motor means to adjust the distance between the two axes A6, A7 and calculating means to control this distance and the orientation of the ophthalmic lens 200 about the axis A6.

Before the edging of the ophthalmic lens 200, the centering and blocking unit sends to the edging machine 500 edging parameters.

These edging parameters comprise:
the shape of the outline S100 of the presentation lens,
the position of the first reference point P150 in the boxing rectangle (that is identical to the position of the second reference point P250),
the orientation of the first reference direction D150 relative to the boxing rectangle (that is identical to the orientation of the second reference direction D250).

Indeed, the edging machine 500 needs to acquire these parameters to know how the ophthalmic lens 200 is held by the blocking arms 520.

Then, thanks to these parameters, the edging machine 500 can machining the edge of the ophthalmic lens, that initially extends along a circular contour, to reduce it to a contour identical to the one of the presentation lens 100.

In a first variant of the invention, the first support 150 can be manually fixed on the presentation lens 100 at the closest position from the center of the boxing rectangle. Because this step is manually implemented, in practice, the first support 150 is fixed at a distance from the center of the boxing rectangle, which distance is lower than 5 mm.

Then, an image of this presentation lens held by the first support is acquired (by means of an optical machine), and the ophthalmic lens is centered.

After this centering operation, the optician has to fix the second support at the center of the boxing rectangle. In practice, the second support 250 is fixed by means of a blocking unit at a zero distance from the center of the boxing rectangle. In this first variant, the aim is to superimpose the first reference point P150 and the second reference point P250 but the result is a superimposition with minor errors (lower than 5 mm) due to an inaccuracy in the handling of the supports.

Because this error is limited, the tilt of the ophthalmic lens 200 in the edging machine is close to the one of the presentation lens in the optical machine.

In a second variant, the first support 150 is fixed on the presentation lens 100 at the closest position from the center of the boxing rectangle and the second support 250 is fixed on the ophthalmic lens 200 by means of one of the shown centering and blocking unit 300; 400 at the exact position of the boxing center.

This second variant is advantageous for two reasons.

The first reason is that the use of the centering and blocking unit 300; 400 ensures the second support 250 to be fixed on the ophthalmic lens 200 at a distance from the center of the boxing rectangle lower than 1 mm.

The second reason is that a standard centering and blocking unit and a standard edging machine are usually programmed to fix a support at the center of the boxing rectangle of the lens to be blocked, and to machine the edge of the lens by considering that this lens is blocked at the center of the boxing rectangle. In other words, in this variant, there is no need to re-program any machine to implement the invention.

In a third variant, the second support 250 is fixed on the ophthalmic lens 200 at an offset position relative to the first reference point P150. More precisely, although the first support 150 was fixed on the presentation lens 100 at a first reference point P150 (in the frame of reference defined by the boxing rectangle), the second support 250 is fixed on the ophthalmic lens 200 at a second reference point P250 (in the frame of reference defined by the boxing rectangle) that is offset relative to the first reference point P150. This third variant is used for ophthalmic lenses having great curvatures (for instance for lenses designed for sport spectacle frames). Indeed, this offset enables a reduction of prismatic effects due to this great curvature.

In another variant, the used blocking unit has no camera neither image acquisition means, but it has a blocking arm suitable to glue the second support on the ophthalmic lens, at a position calculated by the optician.

The invention claimed is:

1. A method for preparing an ophthalmic lens to be edged on the basis of a presentation lens, comprising:
    fixing a first support on one of the faces of the presentation lens, the first support having a shape that defines a first reference point,
    positioning the presentation lens by means of said first support in an optical machine that comprises an image sensor for acquiring images of the presentation lens,
    acquiring, with said image sensor, at least an image of the presentation lens,
    determining, on said acquired image, the shape of the outline of the presentation lens,
    positioning a pupillary point relative to the outline of the presentation lens,
    centering said ophthalmic lens by positioning the outline of the presentation lens relative to the ophthalmic lens so that the pupillary point is superimposed on a centering point of the ophthalmic lens, and
    fixing a second support on one of the faces of the ophthalmic lens, the second support having a shape defining a second reference point, the second support being fixed on the ophthalmic lens so that its second reference point is at a predetermined position relative to the first reference point.

2. The method according to claim 1, wherein the second support is fixed on the ophthalmic lens so that its second reference point is superimposed on the first reference point.

3. The method according to claim 1, wherein, the first support having a shape that defines a first reference direction, the second support having a shape that defines a second reference direction, said second support is fixed on said face of the ophthalmic lens so that its second reference direction is superimposed on the first reference direction.

4. The method according to claim 1, wherein, the outline of the presentation lens being inscribed into a boxing rectangle, the first support is fixed onto said face of the presentation lens at a distance from the center of said boxing rectangle that is lower than 5 millimeters.

5. The method according to claim 1, comprising the calculating edging parameters to machine said ophthalmic lens as a function of the position of said first reference point on the acquired image.

6. The method according to claim 1, wherein, the first support having a shape that defines a first reference direction, said method comprises the calculating of edging parameters to machine said ophthalmic lens as a function of the orientation of said first reference direction on the acquired image.

7. The method according to claim 1 wherein the centering of said ophthalmic lens comprises steps of:
positioning the ophthalmic lens in a second optical machine that is separate or not from said first optical machine and that comprises an image sensor for acquiring an image of the ophthalmic lens, and
acquiring, with said image sensor, at least an image of the ophthalmic lens to enable the positioning of the outline of the presentation lens relative to the image of the ophthalmic lens.

8. The method according to claim 7, wherein, said second optical machine comprising a carrier for carrying said second support, said second support is fixed on said face of the ophthalmic lens by a relative movement of said ophthalmic lens towards said carrier.

9. The method according to claim 8, wherein, said second optical machine comprising an image display, the operation of centering said ophthalmic lens comprises steps of:
displaying, on said image display:
an image that shows at least the position of the pupillary point, and
an image of the ophthalmic lens that shows at least the position a centering point of said ophthalmic lens,
manually adjusting the position of the ophthalmic lens relative to the carrier so that the image of the pupillary point on said image display is superimposed on the image of said centering point.

10. The method according to claim 8, comprising, before the relative movement of said ophthalmic lens towards said carrier along a blocking axis, a controlled movement of said carrier relative to the ophthalmic lens in a plane that is orthogonal or inclined relative to said blocking axis.

11. The method according to claim 1, wherein the position of the pupillary point is determined according to centering data relative at least to the morphology of the future user of the ophthalmic lens.

12. The method according to claim 1, wherein, the outline of the presentation lens being inscribed into a boxing rectangle, the positions of the pupillary point and of the reference point are determined relative to this boxing rectangle.

13. The method according to claim 12, wherein, said presentation lens comprising at least one visible mark on one of its faces, the boxing rectangle is oriented as a function of the position of said mark on the acquired image and the first support is fixed on said face of the presentation lens at a nonzero distance from said mark.

14. The method according to claim 1, wherein, the presentation lens being initially mounted into a spectacle frame and the ophthalmic lens being designed to be mounted into said spectacle frame, the method comprises a step of removing the presentation lens from said frame and a step of positioning the ophthalmic lens in an edging machine by means of the second support.

15. An optical machine for preparing an ophthalmic lens to be edged on the basis of a presentation lens, the optical machine comprising:
an holder, and
an image sensor for acquiring images of lenses positioned onto said holder,
characterized in that it comprises calculating means programmed for performing steps of:
determining the shape of the outline of the presentation lens on an image of the presentation lens fixed on a first support that has a shape that defines a first reference point,
positioning a pupillary point relative to the outline of the presentation lens, and
fixing a second support on one of the faces of the ophthalmic lens, the second support having a shape defining a second reference point, the second support being fixed on the ophthalmic lens so that its second reference point is at a predetermined position relative to the first reference point.

* * * * *